(12) United States Patent
Baxter et al.

(10) Patent No.: US 7,266,045 B2
(45) Date of Patent: Sep. 4, 2007

(54) GUNSHOT DETECTION SENSOR WITH DISPLAY

(75) Inventors: Kevin C. Baxter, Saugus, CA (US); Ken Fisher, Los Angeles, CA (US)

(73) Assignee: ShotSpotter, Inc., Santa Clara, CA (US)

( * ) Notice: Subject to any disclaimer, the term of this patent is extended or adjusted under 35 U.S.C. 154(b) by 0 days.

(21) Appl. No.: 11/042,414

(22) Filed: Jan. 24, 2005

(65) Prior Publication Data

US 2006/0114749 A1 Jun. 1, 2006

Related U.S. Application Data

(60) Provisional application No. 60/481,934, filed on Jan. 22, 2004.

(51) Int. Cl.
*G01S 3/80* (2006.01)
(52) U.S. Cl. .................. 367/128; 367/906; 367/124; 367/127
(58) Field of Classification Search ................ 367/128, 367/906, 127, 124; 340/573.1
See application file for complete search history.

(56) References Cited

U.S. PATENT DOCUMENTS

| 4,792,806 | A | * | 12/1988 | Bent et al. | 342/465 |
|---|---|---|---|---|---|
| 4,855,671 | A | * | 8/1989 | Fernandes | 324/127 |
| 5,455,868 | A | * | 10/1995 | Sergent et al. | 381/56 |
| 5,504,717 | A | * | 4/1996 | Sharkey et al. | 367/124 |
| 5,586,086 | A | * | 12/1996 | Permuy et al. | 367/127 |
| 5,703,835 | A | * | 12/1997 | Sharkey et al. | 367/124 |
| 5,973,998 | A | * | 10/1999 | Showen et al. | 367/124 |
| H001916 | H | * | 11/2000 | Hollander | 367/118 |
| 6,178,141 | B1 | * | 1/2001 | Duckworth et al. | 367/127 |
| 6,600,417 | B2 | * | 7/2003 | Lerg et al. | 340/540 |
| 6,847,587 | B2 | * | 1/2005 | Patterson et al. | 367/127 |
| 7,139,222 | B1 | * | 11/2006 | Baxter et al. | 367/127 |
| 2002/0003470 | A1 | * | 1/2002 | Auerbach | 340/425.5 |
| 2003/0061344 | A1 | * | 3/2003 | Monroe | 709/224 |
| 2004/0100868 | A1 | * | 5/2004 | Patterson et al. | 367/127 |
| 2005/0237186 | A1 | * | 10/2005 | Fisher et al. | 340/539.22 |
| 2006/0095199 | A1 | * | 5/2006 | Lagassey | 701/117 |
| 2006/0114749 | A1 | * | 6/2006 | Baxter et al. | 367/128 |
| 2006/0161339 | A1 | * | 7/2006 | Holmes et al. | 701/207 |
| 2006/0249010 | A1 | * | 11/2006 | John et al. | 89/1.11 |
| 2006/0280033 | A1 | * | 12/2006 | Baxter et al. | 367/127 |

* cited by examiner

*Primary Examiner*—Dan Pihulic

(57) ABSTRACT

A system for locating and identifying an acoustic event such as gunfire. The inventive system employs a plurality of man wearable acoustic sensors for detecting gunfire, each acoustic sensor having a display associated therewith for displaying information concerning the acoustic event to a user. In preferred embodiments, the sensor includes a microphone for receiving acoustic information; an A/D converter; a processor for processing the digitized signal to detect a gunshot and determine a time of arrival; a GPS receiver for determining the position of the acoustic sensor; and a network interface for bidirectional communication with a system server. Preferably the display comprises: an LCD; and an electronically readable compass. When the display and acoustic sensor are in separate housings, the acoustic sensor includes a transmitter and the display includes a receiver for transferring the gunshot information.

2 Claims, 10 Drawing Sheets

GUNSHOT DETECTION SENSOR WITH DISPLAY

This application claims priority from U.S. Provisional Patent Application No. 60/481,934 filed Jan. 2, 2004.

BACKGROUND OF THE INVENTION

1. Field of the Invention

The present invention relates to an acoustic sensor for use in a gunshot location system. More particularly, but not by way of limitation, in a system for identifying and locating an acoustic event, the present invention provides a portable acoustic sensor having a local display to provide information concerning a detected gunshot to a user.

2. Background of the Invention

Gunfire and sniper detection systems are generally known in the art. Such systems can be broadly grouped into three categories: systems which pinpoint the precise location of the source of gunfire; azimuthal sensors which provide an indication of the radial direction to the source of gunfire; and proximity sensors which merely provide an indication that nearby gunfire was detected. While such systems have been demonstrated to perform well in both law enforcement and military applications, the entire field is presently an emerging technology.

In many large cities, gun-related violence has become a plague of epidemic proportions. Urban gunfire, whether crime-related or celebratory in nature, results in thousands of deaths per year in the United States alone. Gunfire location systems, such as those installed in the Redwood City, Calif., Glendale, Ariz., Willowbrook, Calif., City of Industry, Calif., and Charleston, S.C. areas, have proven to be effective in reducing law enforcement response time to detected gunfire, apprehending criminals, collecting evidence, and reducing the occurrence of celebratory gunfire. One such system is described in U.S. Pat. No. 5,973,998, issued to Showen, et al., which is incorporated herein by reference.

Showen, et al. discloses a system wherein sensors are placed at a density of roughly six to ten sensors per square mile. Audio information is sent to a computer at a central location and processed to: detect a gunshot; determine a time of arrival for the gunshot at each sensor; and calculate a location of the shooter from the differences in the times of arrival at three or more sensors. Showen, et al. takes advantage of the long propagation distance of gunfire to place sensors in a relatively sparse array so that only a few of the sensors can detect the gunfire. This permits the processor to ignore impulsive events which only reach one sensor—a concept called "spatial filtering." This concept of spatial filtering radically reduces the sensor density compared to predecessor systems, which require as many as 80 sensors per square mile.

Another gunshot location system is described in co-pending U.S. patent application Ser. No. 10/248,511 by Patterson, et al., filed Jan. 24, 2003, which is incorporated herein by reference. Patterson, et al., discloses a system wherein audio information is processed within each sensor to detect a gunshot and determine a time of arrival at the sensor. Time of arrival information, as determined from a synchronized clock, is then transmitted wirelessly by each sensor to a computer at a centralized location where a location of the shooter is calculated in the same manner as in the Showen, et al. system.

As yet, azimuthal systems have not been as widely accepted as, for example, the Showen, et al. system. Azimuthal sensors typically employ one or more closely-spaced sensors, where each sensor includes several microphones arranged in a small geometric array. A radial direction can be determined by measuring the differences in arrival times at the various microphones at a particular sensor. Presently such systems suffer from somewhat limited accuracy in the determination of the radial angle, which in turn, translates into significant errors in the positional accuracy when a location is found by finding the intersection of two or more radial lines, from corresponding sensors, directed toward the shooter. Since errors in the radial angle result in ever increasing positional error as the distance from the sensor to the source increases, the reported position will be especially suspect toward the outer limits of the sensors' range.

Fixed gunshot location systems typically detect and locate the source of gunfire within a monitored area, and provide that information to a dispatcher at a central location. Upon locating the source of gunfire, an officer is dispatched to the closest address, or other coordinates. Such systems are well suited to law enforcement applications and protecting bases and fixed assets in a military environment.

In an operational environment, for example a battlefield or urban combat in a military environment or SWAT team-type events in a law enforcement environment, man wearable sensors allow gunshot monitoring to take place where it is needed most, in the vicinity of the people that need protecting. In such an environment it is the soldiers or police officers on-site who have the most immediate need for gunfire location information. Presently deployed systems do not provide individualized information directly to the people who are in the line of fire.

The need for information delivery to individual officers or soldiers is particularly important in echo prone environments or when weapons are used which fire supersonic projectiles. In either case, audible cues received by the officer/soldier may be drastically misleading and lead to a failure to take proper cover or to return fire in the wrong direction.

It is thus an object of the present invention to provide a man wearable acoustic sensor having a display as part of a gunshot location system which delivers gunshot information directly to the officer/soldier equipped with the sensor.

SUMMARY OF THE INVENTION

The present invention provides a gunshot location system which employs man wearable acoustic sensors, each of which includes a display for delivery of information concerning detected gunfire directly to the sensor wearer. In a preferred embodiment, the inventive system includes: a plurality of man wearable acoustic sensors, each sensor having a GPS receiver; a host processor; and a bidirectional communication network adapted to deliver information between the sensors and a host processor. Associated with each sensor is a display configured to receive data from a particular sensor and to display such information to the person wearing the sensor.

In one preferred embodiment, the sensor and the display are housed in separate housing. The sensor includes a low-power radio frequency transmitter to send information to the watch and the watch includes a receiver to receive the information.

In another preferred embodiment, the display further includes an electronically readable compass so that shooter information can be displayed relative to the heading of the person wearing the sensor. Optionally, local magnetic declination is transmitted to the watch so that bearing to the shooter can be adjusted to true North.

In still another preferred embodiment, the display further includes an LCD display to provide the user with a visual indication of the shooter's information. Optionally, the LCD may be multi-color to allow color coding of certain information.

In yet another preferred embodiment, the display further includes means for aural delivery of gunfire information. Preferably, the display is used in conjunction with a soldier worn, or carried radio system, to deliver audio information over existing headphones or an earpiece already worn by the soldier.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
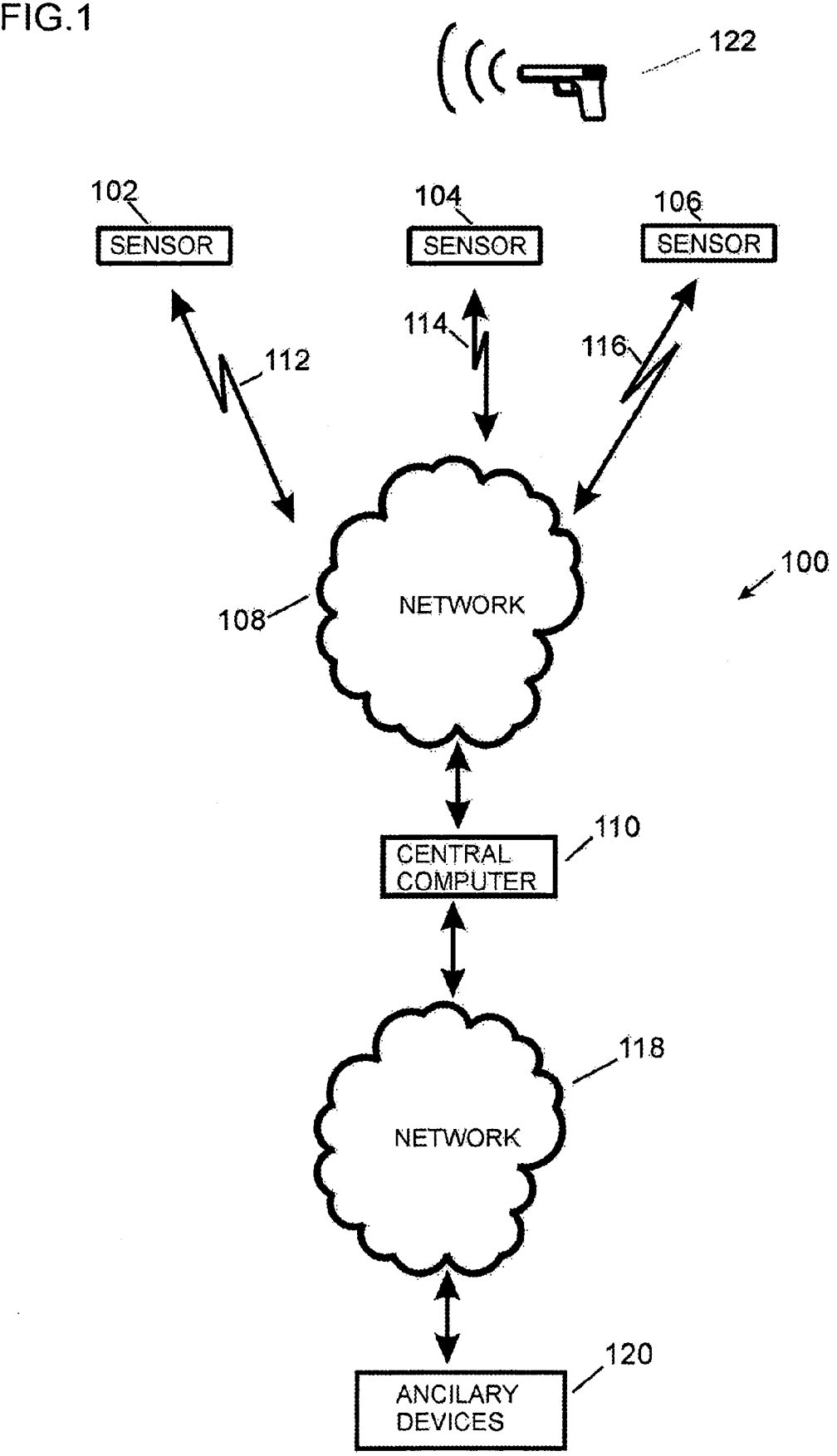
FIG. 1 depicts a preferred configuration of the inventive gunshot detection system.

Referring now to the drawings, wherein like reference numerals indicate the same parts throughout the several views, a representative gunshot detection system 100 is shown in its general environment in FIG. 1. In a preferred embodiment, a plurality of sensors 102-106 are dispersed over a monitored area. Preferably, each sensor is placed such that it has a relatively unobstructed acoustic view around its immediate area. By way of example and not limitation, with regard to fixed installations, suitable sites include: placed atop a building; placed atop utility or light poles; on towers, etc. Typically sensors 102-106 communicate through a communication network 108 with a centralized processor 110 wherein information concerning acoustic events is processed to provide details of the event, such as the source location of a gunshot, time of the gunshot, the number of detected gunshots, the type of event, and the like. It should be noted that sensors 102-106 may be any combination of wired or wireless sensors, that communications paths 112-116 may carry either analog or digital signals, and that network 108 may comprise any combination of sub-networks, such as, by way of example and not limitation: a telephone network; the internet; a private computer network; a wireless network, or even a collection of dedicated wires routed to the sensor array.

In a military environment, or during certain police operations, it may be preferable that sensors 102-106 are man-wearable. In such a system, the host computer 110 and a display device 120 would likely be carried by a squad leader or supervisor. Further, associated with each sensor 102-106 is a display 120 for displaying shooter information to the individual soldier or police officer. In such as a system, other ancillary systems may use data collected by the system and reported in real time, or near real time, to higher levels or command centers.

As will be appreciated by those skilled in the art, information about a detected acoustic event is typically output to a person of interest such as a police dispatcher or directly to individual officers, as through network 118 to display devices 120 or a computer console. When weapon 122 is fired, the muzzle blast reaches sensors 102-106 at different times based on the speed of sound and the distance of each sensor from the shooter. Whether the acoustic information is processed at the sensor, or at computer 110, a time of arrival is determined for each sensor and the differences of the various times of arrival are processed to determine a location of the source of the gunshot. In response to the gunshot, information is provided at device 120.

Figure 2:
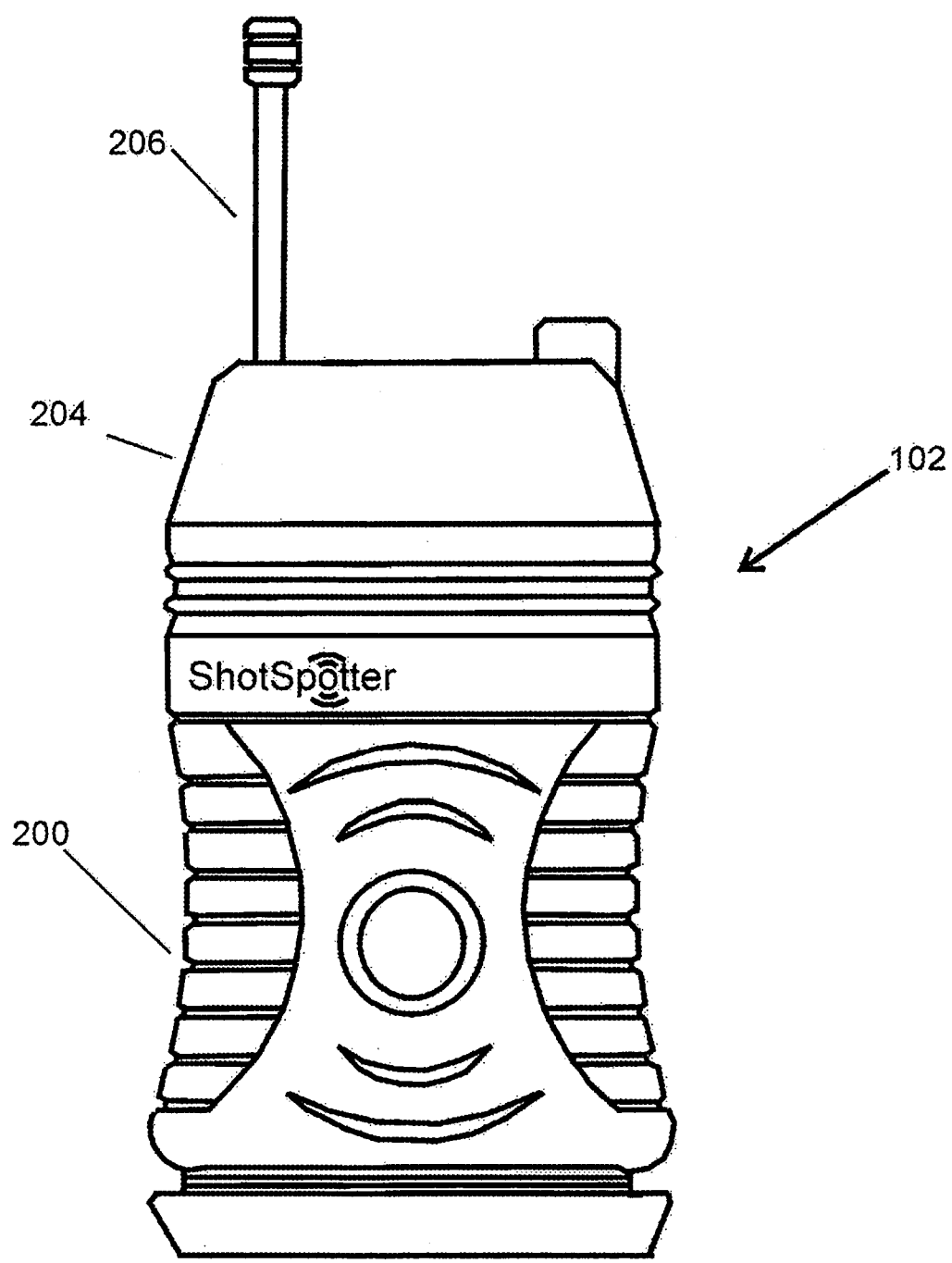
FIG. 2 provides a front view of a preferred embodiment of a sensor as employed in the inventive system.

A preferred embodiment of an acoustic sensor 102 is shown in FIG. 2. Typically acoustic sensor 102 includes a housing 200, a support (not shown) for mounting sensor 102, and a windscreen 204 for protecting internal elements from the environment, while allowing acoustic waves to pass through to the interior. If sensor 102 is wireless, antenna 206 is provided for radio frequency communication.

Figure 5:
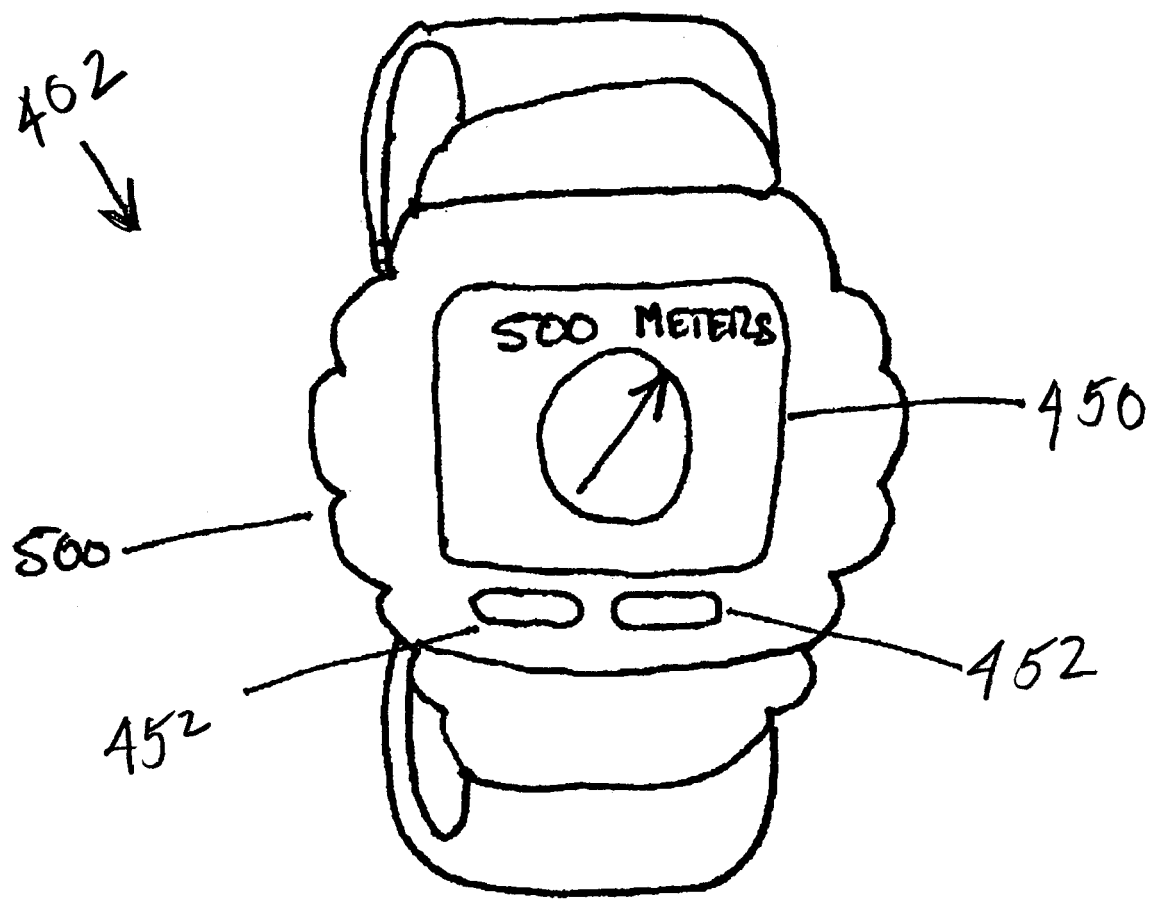
FIG. 5 provides a front view of a preferred embodiment of a watch display.

With reference to FIG. 5, associated with acoustic sensor 102, is a display device 402. In one preferred embodiment, display 402 is housed in a wristwatch-like housing 500. Viewed from its exterior, display 402 comprises: liquid crystal display 450; and buttons 452 and 452. Display 402 provides information concerning gunfire as gunshots are detected, as discussed in more detail hereinbelow.

Figure 4:
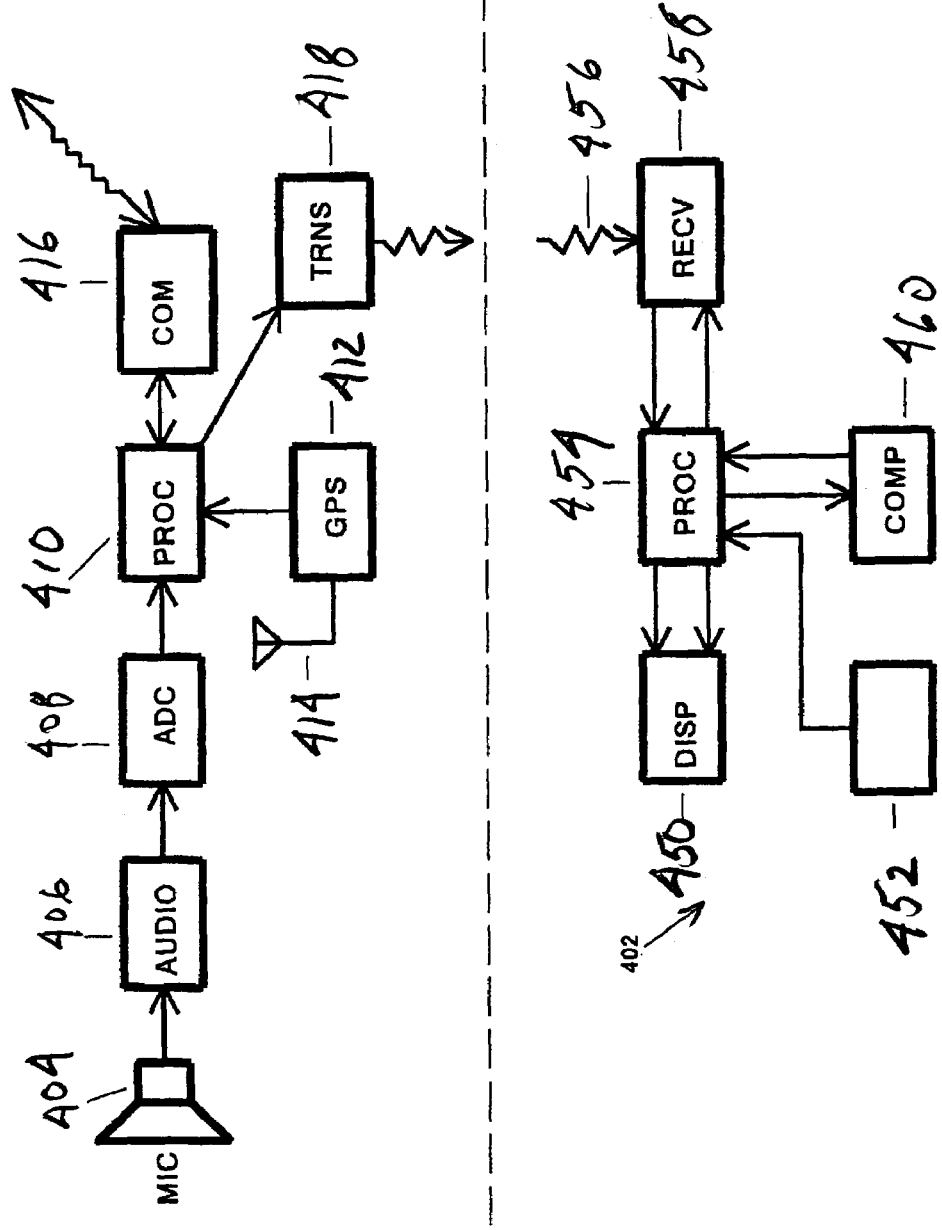
FIG. 4 provides a block diagram for a preferred sensor wherein the acoustic sensor and display are separate.

A block diagram of the acoustic sensor 102 and display 402 combination is shown in FIG. 4. Acoustic sensor 102 comprises: a microphone 404 for receiving acoustic information; amplifier 406, and/or other signal conditioning; a processor 410, typically a digital signal processor (DSP); a global positioning system (GPS) receiver 412 and it associated antenna 414 which provides an absolute position of sensor 102, and optionally a synchronized clock; a communication interface 416 for communicating with a server or host system; and RF transmitter 418 for communication with display 402. Signals from amplifier 406 are converted into digital form by analog to digital converter 408. In the preferred embodiment, A/D converter 408 is integrated in DSP 410.

Display 402 comprises: LCD 450; buttons 452 to provider an operator with a means for inputting commands; CPU 454 for controlling the operation of display 402; an electronically readable compass 460 which provides user heading information; and receiver 458 for receiving RF commands from the acoustic sensor 102. One suitable electronic compass is the model HMC6352 electronic compass manufactured by Honeywell International, Plymouth, Minn.

When a gunshot is received at microphone 404, the signal is amplified by amplifier 406 and converted to its digital form by A/D converter 408. The digitized audio is processed by processor 410 to detect the event and determine a time of arrival. In one preferred embodiment, the accurate real time for the time of arrival is provided by GPS receiver 412. The location acoustic sensor 102 and the time of arrival information are transmitted to host computer 110 (FIG. 1) where information from several reporting sensors is processed to find the source location of the gunshot through the differences in the times of arrival in light of the acoustic sensor locations.

Figure 3:
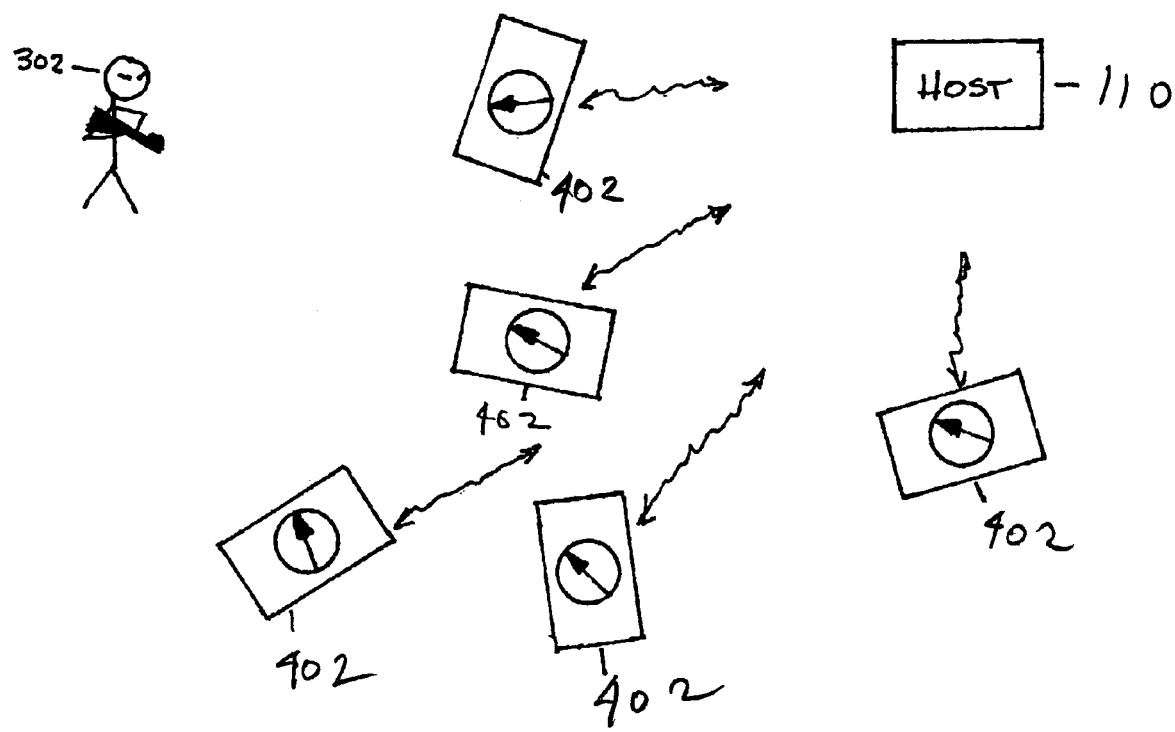
FIG. 3 depicts azimuth indications as provided on the displays in a sensor array.

With further reference to FIG. 3, for each acoustic sensor 102 equipped with a display 402, the host computer 110 then sends a position of the source of the gunfire back to acoustic sensor 102. The acoustic sensor 102 then calculates the range and bearing to shooter 302 based on its GPS provided position and the shooter position received from host 110. The range and bearing information 456 are then transmitted to display 402. As the soldier or police officer moves around, the range and bearing are recalculated so that the displayed vector always points toward the shooter 302 as shown in FIG. 3. In another preferred embodiment, in addition to the shooter position, host 110 also sends the local magnetic declination to acoustic sensor 110 so that the difference between true angles, as calculated from the shooter position and the sensor position, can be reconciled with magnetic angles as read from the compass, to correctly point the vector towards shooter 302.

Figure 6:
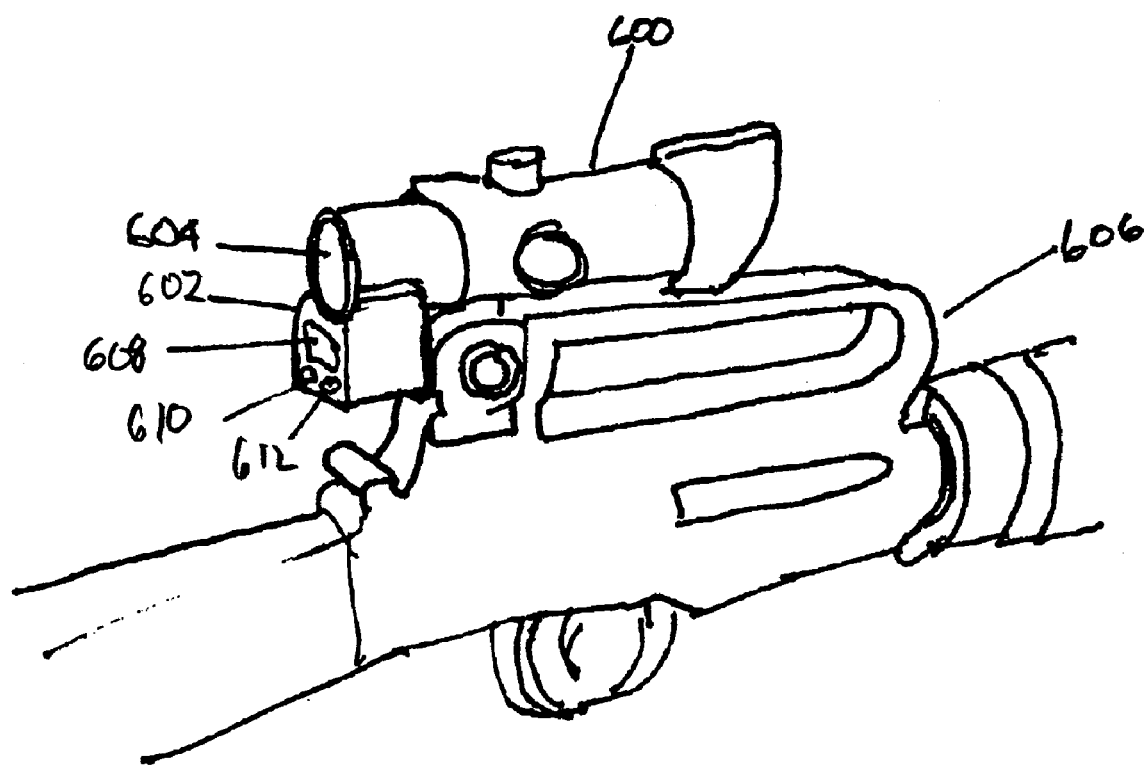
FIG. 6 provides a perspective view of a preferred embodiment of a rifle mounted display.
Figure 7:
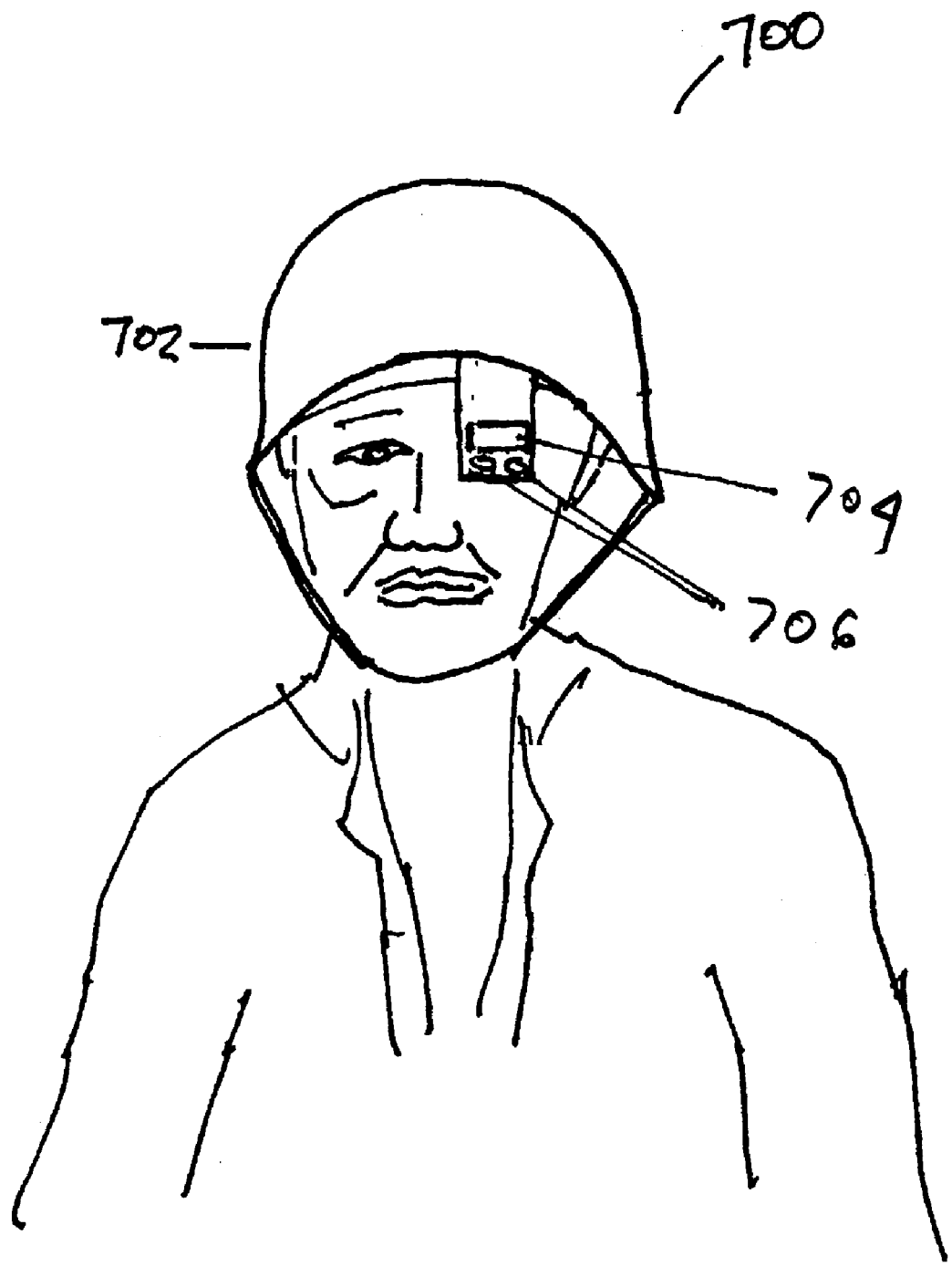
FIG. 7 provides a front view of a preferred embodiment of a helmet mounted display.

Turning to FIGS. 6 and 7, the display can alternatively be built into or attached to equipment already carried by a soldier and generally in the vision of the soldier. Display 602 is rifle mounted to be within the field of view of the person shooting rifle 606. Information is viewed through LCD 608 and commands are input through switches 610 and 612. In a preferred embodiment, targeting information is displayed in scope 600 as the marksman sights through ocular 604.

Alternatively, display 700 may be mounted to the soldier's helmet 702. An LCD, CRT, or similar graphics display device 704 projects into the field of view of the soldier. Switches 706 allow the soldier to control operation of the display device.

Figure 8:
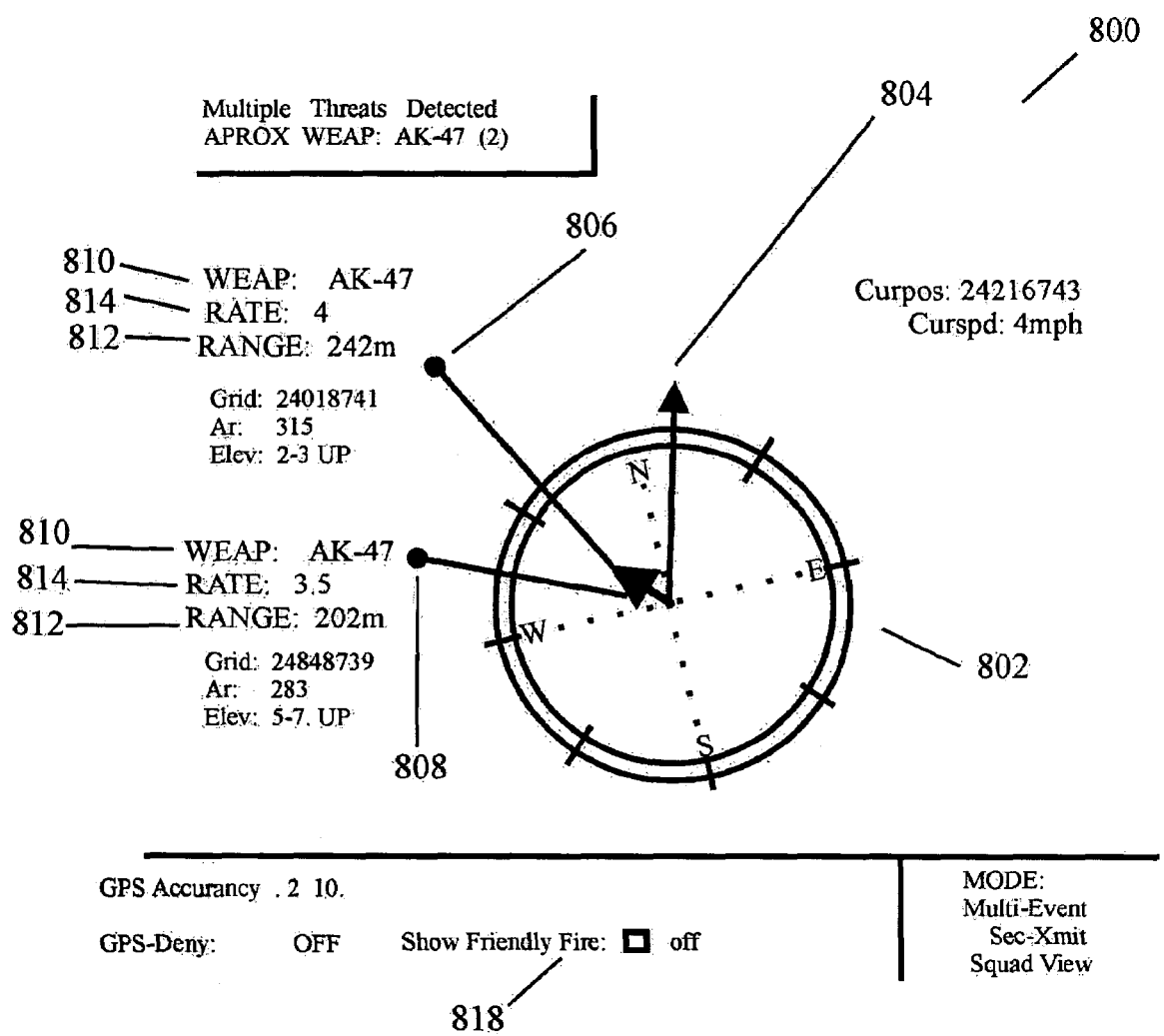
FIG. 8 depicts the information displayed in a preferred embodiment.

Referring next to FIG. 8, when a display device is selected having sufficient pixels, preferred embodiments of the inventive system can show consider detail concerning detected events. By way of example and not limitation, in display 802, the display shows any occurrences of friendly fire at 818, for shooter 804 display 802 shows the relative position on the map, a weapon type at 810, a firing rate at 814, a range at 812. Similarly, for shooter 806, display 802 provides weapon type 810, firing rate 814, and range 812. Pointer 804 shows the current heading of the user.

Figure 9:
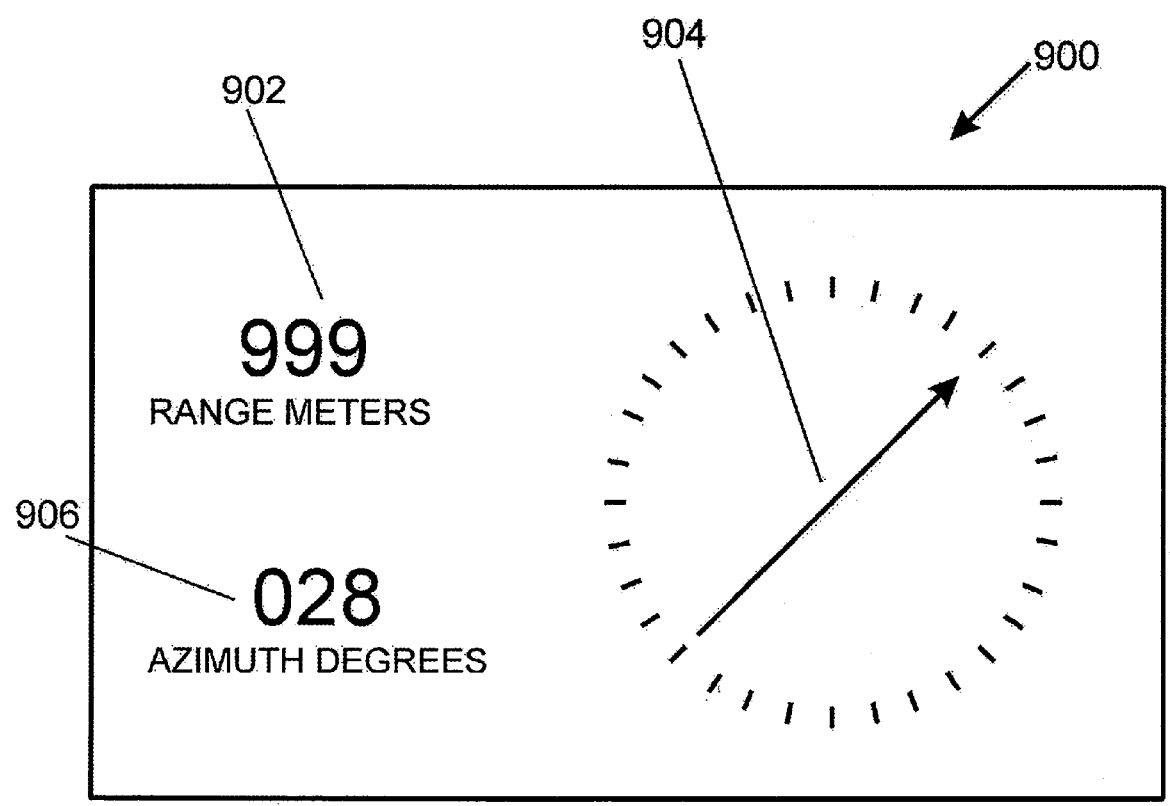
FIG. 9 depicts the information displayed in another preferred embodiment.

As a practical matter, considering the workload of a soldier under fire, a display providing somewhat less information may actually be preferred. Turning to FIG. 9, a display 900 is provided which, on a compass rose, simply points an arrow 904 towards the shooter and provides a digital representation of azimuth 906 and range 902. Display 900 is particularly well suited for a wristwatch display 402 (FIG. 5).

Figure 10:
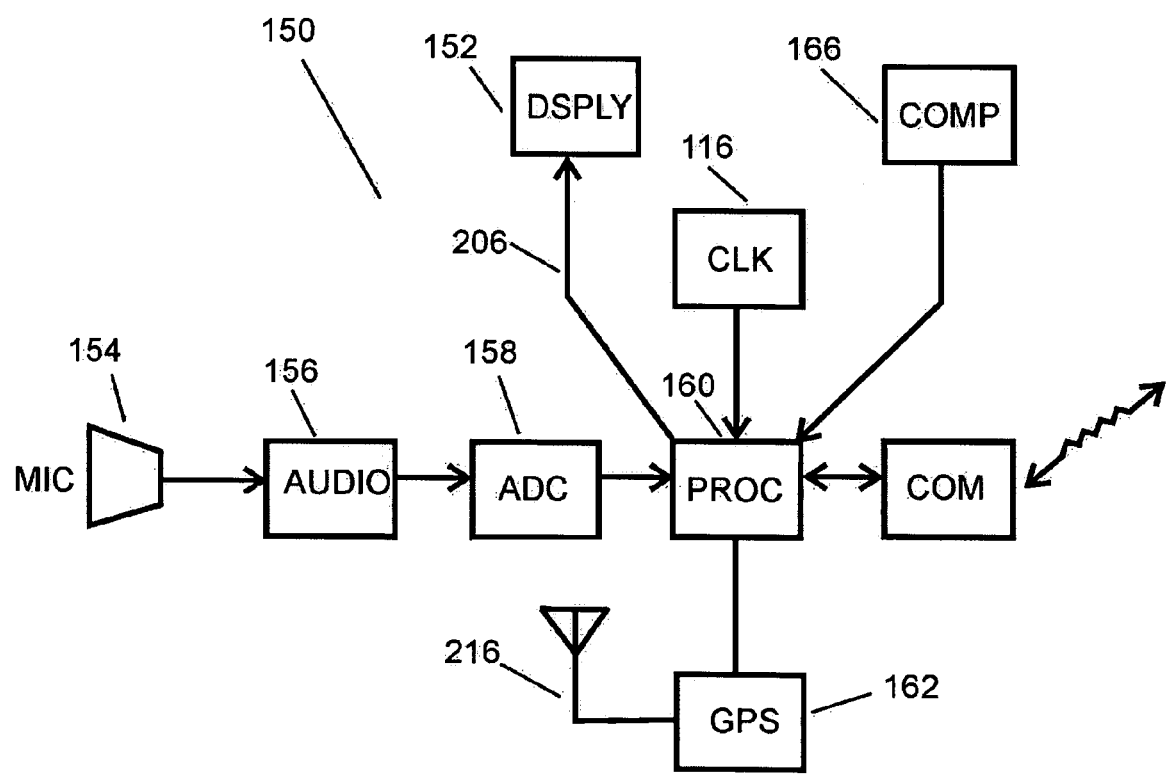
FIG. 10 provides a block diagram of a preferred embodiment of the inventive sensor wherein the acoustic sensor and display are integrated.

In other preferred schemes, the acoustic sensor and the display may be integrated into a common housing. Such an embodiment is well suited to situations where the acoustic sensor is built into equipment already carried by the soldier, such as a rifle, helmet, or the like. If the sensor can be readily placed in the field of view of the soldier, separating the sensor and display unnecessarily complicates the system. With reference to FIG. 10, a block diagram for a sensor 150 having an integrated display 152 comprises: a microphone 154; an amplifier 156; A/D converter 158, typically integrated into processor 160; and GPS receiver 162. A compass 166 provides soldier heading information and display 152 provide gunshot information to the soldier as discuss with relation to previously described embodiments.

As will be apparent to those skilled in the art, it is most preferable that, when the sensor and display require wireless communication therebetween, that an addressing scheme is employed to prevent information from being received from the wrong sensor. Packet transmission schemes are well known in the art and headers having an address and a checksum are commonly a part of such packets. Implementation of such a radio packet transmission and reception could be readily accomplished by one of ordinary skill in the art with benefit of this disclosure.

It should also be noted that while preferred embodiments of the present invention have been described in connection with a preferred gunshot location systems, the techniques for providing precision location information to a soldier may be applied to other gunshot location systems such as azimutal systems, proximity systems, and the like.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the scope and spirit of this invention.

What is claimed is:

1. A gunshot location system comprising:
   an array of acoustic sensors, at least one sensor of said array of sensors comprises:
      a microphone for receiving acoustic signals;
      a processor for processing received acoustic signals to detect an acoustic event;
      a GPS receiver for determining a sensor position; and
      a first network interface;
   a display associated with said at least one sensor and in communication with at least one sensor, said display comprising:
      a graphic device for displaying information to a user; and
      an electronically readable compass for determining a heading of the user; and
   a server in communication with said first network interface wherein, when said acoustic sensor detects an acoustic event, said sensor position is transmitted to said server through said first network interface and when a plurality of sensors report said acoustic event, said server determines a source location for said acoustic event and transmits said source location to said sensor through said first network interface and said acoustic sensor communicates range and bearing information to said display.

2. The gunshot detection system of claim 1 wherein said acoustic sensor and said display comprise separate housings and said sensor further comprises a transmitter for transmitting said range and bearing information to said display and said display further comprises a receiver for receiving said range and bearing information.

* * * * *